3,350,404
N-ARALKYL AMIDES OF 4-PHENYL-
PIPERIDINO-4-ALKANOIC ACIDS
Harvey B. Hopps, Milwaukee, Wis., assignor to Aldrich Chemical Company, Inc., Milwaukee, Wis., a corporation of Wisconsin
No Drawing. Filed Apr. 7, 1964, Ser. No. 358,067
8 Claims. (Cl. 260—294)

This invention relates to novel 4-arylpiperidines. More particularly, this invention relates to N-aralkyl amides of 4-phenylpiperidino alkanoic acids and a process for the preparation thereof.

In accordance with the present invention, there is provided a member selected from the group consisting of 4-arylpiperidines of the formula (I)

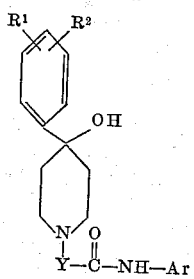

wherein
$R^1$ and $R^2$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)-alkylsulfonyl, methylenedioxy, cycloalkyl radicals having from 5 to 7 carbon atoms incusive and cycloalkoxy radicals having from 5 to 7 carbon atoms inclusive,
Y is a (lower)alkylene radical,
Ar is a member selected from the group consisting of radicals of the formulae (II)

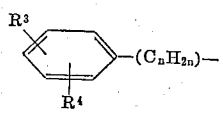

and (III)

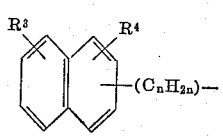

wherein
$n$ is a whole integer from 1 to 6 inclusive, and
$R^3$ and $R^4$ are each a member selected from the group consisting of hydrogen, chloro, bromo, iodo, fluoro, trifluoromethyl, amino, nitro, (lower)alkyl, (lower)alkoxy, hydroxy, phenyl, phenoxy benzyl, (lower)alkylamino, di(lower)alkylamino, (lower)alkanoylamino, (lower)alkylthio, sulfamyl, (lower)alkanoyl, (lower)-alkylsulfonyl, methylenedioxy, cycloalkyl radicals having from 5 to 7 carbon atoms inclusive, cycloalkoxy radicals having from 5 to 7 carbon atoms inclusive;
and the pharmaceutically acceptable nontoxic salts thereof.

Among the radicals represented by $R^1$, $R^2$, $R^3$ and $R^4$, hydrogen, chloro, bromo, iodo, fluoro, trifluoromethyl, nitro, (lower)alkyl, (lower)alkoxy, (lower)alkylthio, (lower)alkanoyl, phenyl, phenoxy and benzyl are preferred; preferably, $R^1$ or $R^2$ and $R^3$ or $R^4$ are hydrogen, and usually, $R^1$, $R^2$, $R^3$ and $R^4$ are all hydrogen.

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic and the like.

The term "(lower)alkyl" as used herein means both straight and branched chain aliphatic hydrocarbon radicals having from 1 to 8 carbon atoms such as methyl, ethyl, propyl, isopropyl, butyl, isobutyl, t-butyl, amyl, hexyl, 2-ethylhexyl, etc.

Similarly, where the term "(lower)" is used as part of the description of another group, e.g. "(lower)alkoxy," it refers to the alkyl portion of such group which is therefore as described in connection with "(lower)alkyl."

The meaning of the term "(lower)alkylene" is similar to that of "(lower)alkyl" in that it also means both straight and branched chain aliphatic hydrocarbon radicals having from 1 to 8 carbon atoms. Examples of "(lower)alkylene" radicals are methylene, ethylene, propylene, isopropylene, butylene, isobutylene, t-butylene, amylene, hexylene, 2-ethylhexylene and the like.

The compounds of this invention are valuable pharmaceutical agents. They exhibit antiarrhythmic activity which makes the compounds useful for the treatment of arrhythmia. In addition, the compounds, being tertiary bases, can be used to recover and purify penicillin with which they form salts.

Tests of the compounds of the present invention for antiarrhythmic activity were carried out by administering the compounds at dosages of 10 mgm./kg. intraperitoneally to experimental animals in which electrically induced ventricular fibrillation could be induced. Prevention of the ventricular fibrillation by a test compound, for example, N-benzyl-β-(4-hydroxy-4-phenylpiperidino)-propionamide hydrochloride, indicates that the compound is an antiarrhythmic agent.

The compounds of the present invention are prepared by the following series of steps:

(1) An aralkylamine of the formula $$NH_2-Ar$$

wherein Ar is as represented above, is reacted with an equimolar quantity of a halo or tosyl acid chloride of the formula

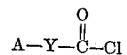

wherein A is a radical selected from the group consisting of chloro, bromo, iodo or tosyl, and Y is as represented above according to the method described in United States Patent No. 2,569,288

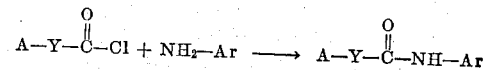

wherein A, Y and Ar are as previously defined. The product, an N-aralkyl halo or tosylalkanoic acid amide, is a novel intermediate, useful in the second step of the method for the preparation of the 4-arylpiperidines of Formula I, and is considered within the scope of this invention.

(2) The N-aralkyl halo or tosylalkanoic acid amide prepared in Step 1 is then reacted with an equimolar quantity of a piperidine of the formula

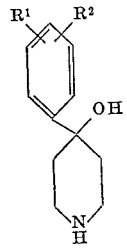

wherein $R^1$ and $R^2$ are as described above, in the presence of triethylamine and dimethylformamide, and a trace of potassium iodide at elevated temperature, i.e., 65–70° C., for several hours according to the procedure described in United States Patent No. 2,937,180. The cooled reaction mixture is then poured into water containing an equimolar amount of sodium hydroxide. The free base is collected by filtration and dried.

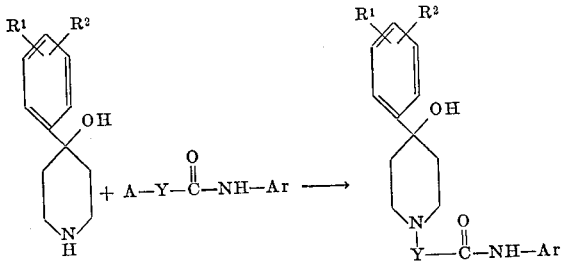

wherein A, $R^1$, $R^2$, Y and Ar are as defined above.

The free base may be readily converted, if desired, to a nontoxic acid addition salt by conventional procedures.

An alternate procedure for preparing the compounds of the invention comprises the addition of the secondary piperidine to an acrylic acid amide or a substituted acid amide in the presence of a strong base, e.g., sodium hydroxide, according to the equation

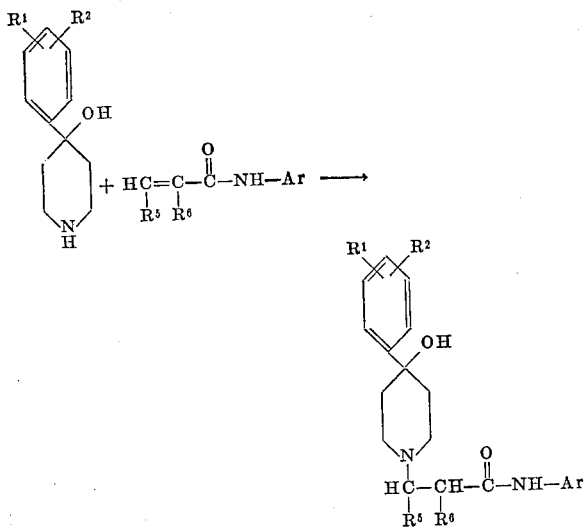

wherein $R^1$, $R^2$ and Ar are as represented above, and $R^5$ and $R^6$ are each hydrogen or (lower)alkyl.

A third procedure by which the compounds can be prepared involves the reaction of a halo or tosylalkanoic acid ester with the secondary piperidine and subsequent conversion to the amide

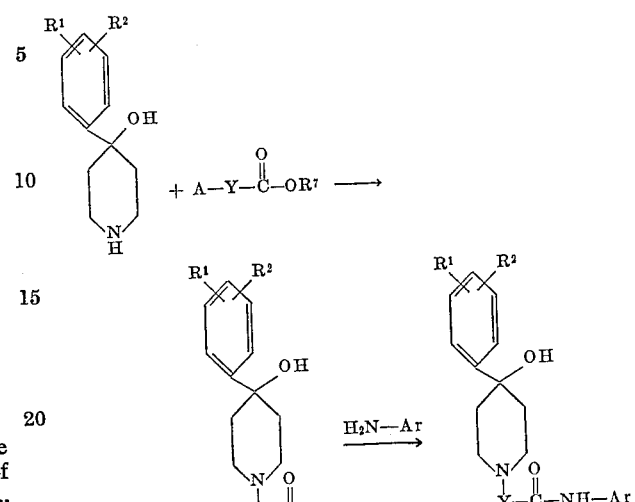

wherein A, $R^1$, $R^2$, Y and Ar are as described above, and $R^7$ is methyl, ethyl, p-nitrophenyl, cyanomethyl, succinimido, phthalimido, and $OR^7$ may also be chloro or bromo.

In each of the three methods for the preparation of the compounds of this invention, the secondary piperidine and other reactants are brought together in a suitable medium such as dimethylformamide, ethanol, isopropyl alcohol, toluene, xylene, dimethoxyethane, diethyleneglycol and heated at 50–100° C. for several hours in the presence of a base such as triethylamine, aminopyrine, diethylaniline, potassium carbonate, and triethyl phenyl ammonium hydroxide. The cooled reaction mixture is then poured into dilute sodium hydroxide. The basic amide or ester precipitates either as a water insoluble oil or a crystalline solid and is extracted with such solvents as methylene dichloride, chloroform, carbon tetrachloride, or by filtration of the solid product. In the case of the third process, the ester that is obtained is reacted with the appropriate aralkylamine or a substituted aralkylamine, the product is then converted to a nontoxic acid addition salt.

It is obvious that in some cases, the radicals attached to the aromatic ring, e.g., the amino radical, will interfere with the reactions used in preparing the compounds of this invention. Therefore, it is necessary to block the reactive radicals before proceeding with the reactions. This is conveniently accomplished by methods known in the art. For example, in the case of an amino substitued aromatic ring, the amino group is blocked by forming the Schiffs' base by reacting the aromatic amine with an aldehyde such as acetaldehyde, and after all reactions have been completed, the Schiffs' base may be cleaved with dilute hydrochloric acid to regenerate the free amino group.

The starting materials used in the processes described herein are compounds which are either commercially available, well known in the prior art, or easily prepared in accordance with standard organic procedures previously described in the chemical literature.

The compounds of this invention may be administered as the free bases or in the form of their nontoxic addition salts. They may be compounded and formulated into pharmaceutical preparations for oral or parenteral administration with organic or inorganic solid materials or liquids which are pharmaceutically acceptable carriers. The compositions may take the form of tablets, powder granules, capsules, suspensions, solutions and the like. Such compositions are considered within the scope of this invention.

The following examples are intended to illustrate the invention described herein without unduly restricting it.

EXAMPLE 1

Preparation of N-benzyl-β-chloropropionamide

To a slurry of benzylamine (0.05 mole) and water (30 ml.), cooled by means of an ice water bath to 10° C., is added 3 - chloropropionyl chloride (0.05 mole) and a solution of sodium hydroxide (0.05 mole) dissolved in water (20 ml.). The rate of addition of the liquids is such as to keep the temperature below 15° C. and the pH near 8. Upon completion of the addition, the mixture is stirred briefly, and permitted to stand overnight. The resulting solid, N - benzyl - β - chloropropionamide, is collected when dry, and then recrystallized from benzene.

EXAMPLE 2

In the procedure of Example 1, benzylamine is replaced by 0.05 mole of

β-naphthylmethylamine,
α-naphthylmethylamine,
3-chlorobenzylamine,
3-hydroxy-4-chlorobenzylamine,
3-methoxybenzylamine,
3-nitrobenzylamine,
3,4-methylenedioxybenzylamine,
2,6-dibromobenzylamine,
3,4-dimethylbenzylamine,
2-bromo-4-hydroxybenzylamine,
2-bromo-3-hydroxybenzylamine,
2,5-dimethoxybenzylamine,
phenylethylamine,
4-iodobenzylamine,
3-fluorobenzylamine,
4-trifluoromethylbenzylamine,
3-aminobenzylamine,
2-methylaminobenzylamine,
3-dimethylaminobenzylamine,
2-methylbenzylamine,
4-phenylbenzylamine,
3-benzylbenzylamine,
4-phenoxybenzylamine,
4-cyclohexylbenzylamine,
4-cyclopentyloxybenzylamine,
4-sulfamylbenzylamine,
3-acetamidobenzylamine,
4-methylthiobenzylamine,
4-acetylbenzylamine,
3-methylsulfonylbenzylamine,
4-trifluoromethyl-1-naphthylmethylamine,
2,7-dibromo-3-naphthylmethylamine and
phenylisopropylamine, to produce the following products, N-β-naphthylmethyl-β-chloropropionamide,
N-α-naphthylmethyl-β-chloropropionamide,
N-(3-chlorobenzyl)-β-chloropropionamide,
N-(3-hydroxy-4-chlorobenzyl)-β-chloropropionamide,
N-(3-methoxybenzyl)-β-chloropropionamide,
N-(3-nitrobenzyl)-β-chloropropionamide,
N-(3,4-methylenedioxybenzyl)-β-chloropropionamide,
N-(2,6-dibromobenzyl)-β-chloropropionamide,
N-(3,4-dimethylbenzyl)-β-chloropropionamide,
N-(2-bromo-4-hydroxybenzyl)-β-chloropropionamide,
N-(2-bromo-3-hydroxybenzyl)-β-chloropropionamide,
N-(2,5-dimethoxybenzyl)-β-chloropropionamide,
N-phenylethyl-β-chloropropionamide,
N-(4-iodobenzyl)-β-chloropropionamide,
N-(3-fluorobenzyl)-β-chloropropionamide,
N-(4-trifluoromethylbenzyl)-β-chloropropionamide,
N-(3-aminobenzyl)-β-chloropropionamide,
N-(2-methylaminobenzyl)-β-chloropropionamide,
N-(3-dimethylaminobenzyl)-β-chloropropionamide,
N-(2-methylbenzyl)-β-chloropropionamide,
N-(4-phenylbenzyl)-β-chloropropionamide,
N-(3-benzylbenzyl)-β-chloropropionamide,
N-(4-phenoxybenzyl)-β-chloropropionamide,
N-(4-cyclohexylbenzyl)-β-chloropropionamide,
N-(4-cyclopentyloxybenzyl)-β-chloropropionamide,
N-(4-sulfamylbenzyl)-β-chloropropionamide,
N-(3-acetamidobenzyl)-β-chloropropionamide,
N-(4-methylthiobenzyl)-β-chloropropionamide,
N-(4-acetylbenzyl)-β-chloropropionamide,
N-(3-methylsulfonylbenzyl)-β-chloropropionamide,
N-(4-trifluoromethyl-1-naphthylmethyl)-β-chloropropionamide,
N-(2,7-dibromo-3-naphthylmethyl)-β-chloropropionamide and
N-phenylisopropyl-β-chloropropionamide,
respectively.

EXAMPLE 3

When, in the procedure of Example 1, the β-chloropropionyl chloride is replaced by 0.05 mole of chloroacetyl chloride,
α-chloropropionyl chloride,
γ-chlorobutyryl chloride,
α-chloroisobutyryl chloride,
β-bromopropionyl chloride,
β-iodopropionyl chloride,
γ-chlorohexanoyl chloride and
β-tosylpropionyl chloride, the following compounds are produced, N-benzyl-chloroacetamide,
N-benzyl-α-chloropropionamide,
N-benzyl-γ-chlorobutyramide,
N-benzyl-α-chloroisobutyramide,
N-benzyl-β-bromopropionamide,
N-benzyl-β-iodopropionamide,
N-benzyl-γ-chlorohexanoamide and
N-benzyl-β-tosylpropionamide,
respectively.

EXAMPLE 4

Preparation of N-benzyl-β-(4-phenyl-4-hydroxypiperidino)propionamide

A mixture containing 4 - phenyl - 4 - hydroxypiperidine (0.05 mole), N - benzyl - β - chloropropionamide (0.05 mole), triethylamine (0.05 mole), dimethylformamide (30 ml.), and potassium iodide (100 mgm.) is stirred and heated at 65–70° C. for about 4 hours. The cooled reaction mixture is poured into 300 ml. of water containing sodium hydroxide (0.05 mole). The N - benzyl - β - (4-phenyl - 4 - hydroxypiperidino)propionamide precipitates and is separated by filtration and is found to have a melting point of 137–139° C.

EXAMPLE 5

Preparation of N-benzyl-β-(4-phenyl-4-hydroxypiperidino) propionamide hydrochloride The N-benzyl-β-(4-phenyl-4-hydroxypiperidino)propionamide prepared in Example 4 is dissolved in methylene chloride and converted to its hydrochloride salt by passing gaseous hydrogen chloride into the solution. The salt, N-benzyl - β - (4-phenyl-4-hydroxypiperidino)propionamide hydrochloride, precipitates out and is recrystallized from water and is found to have a melting point of 200–202° C. and to have the following analysis.

Analysis Calculated for $C_{21}H_{27}ClN_2O_2$: C, 67.41%; H, 7.28%; Cl, 9.48%; N, 7.49%. Found: C, 67.34%; H, 7.27%; Cl, 9.55%; N, 7.31%.

EXAMPLE 6

Preparation of N-benzyl-β-[4-(4-chlorophenyl)-4 hydroxypiperidino]propionamide When, in the procedure of Example 4, 4-phenyl-4-hydroxypiperidine is replaced by an equal molar quantity of 4-(4-chlorophenyl)-4-hydroxypiperidine, N-benzyl-β-[4 - (4-chlorophenyl)-4-hydroxypiperidino]propionamide is obtained, which is found to have a melting point of 158–160° C.

EXAMPLE 7

*Preparation of N-benzyl-β-[4-(4-chlorophenyl)-4-hydroxypiperidino]propionamide hydrochloride*

When, in the procedure of Example 5, N-benzyl-β-(4-phenyl-4-hydroxypiperidino)propionamide is replaced by an equal molar quantity of N-benzyl-β-[4-(4-chlorophenyl)-4-hydroxypiperidino]propionamide, N-benzyl-β-[4-(4-chlorophenyl)-4-hydroxypiperidino]propionamide hydrochloride is obtained which is found to have a melting point 205–206° C., and the following analysis.

Analysis Calculated for $C_{21}H_{26}Cl_2N_2O_2$: C, 61.61%; H, 6.40%; N, 6.85%; Cl, 17.32%. Found: C, 61.61%; H, 6.52%; N, 7.06%; Cl, 17.16%.

EXAMPLE 8

When, in the procedure of Example 4, the 4-phenyl-4-hydroxypiperidine is replaced by an equal molar amount of 4-3-fluorophenyl-4-hydroxypiperidine,
4-4-trifluoromethylphenyl-4-hydroxypiperidine,
4-2-bromophenyl-4-hydroxypiperidine,
4-3-chlorophenyl-4-hydroxypiperidine,
4-2-sulfamylphenyl-4-hydroxypiperidine,
4-3-hydroxyphenyl-4-hydroxypiperidine,
4-4-ethylphenyl-4-hydroxypiperidine,
4-3-methylphenyl-4-hydroxypiperidine,
4-2,4-dimethoxyphenyl-4-hydroxypiperidine,
4-3-methylthiophenyl-4-hydroxypiperidine,
4-2-aminophenyl-4-hydroxypiperidine,
4-4-chlorophenyl-4-hydroxypiperidine,
4-3-trifluoromethylphenyl-4-hydroxypiperidine,
4-3,4-methylenedioxyphenyl-4-hydroxypiperidine,
4-4-methoxyphenyl-4-hydroxypiperidine,
4-2-methylaminophenyl-4-hydroxypiperidine,
4-3-diethylaminophenyl-4-hydroxypiperidine,
4-2-acetylphenyl-4-hydroxypiperidine,
4-4-acetamidophenyl-4-hydroxypiperidine,
4-2-propylthiophenyl-4-hydroxypiperidine,
4-(2-hydroxy-4-nitrophenyl)-4-hydroxypiperidine,
4-4-phenylphenyl-4-hydroxypiperidine,
4-3-benzylphenyl-4-hydroxypiperidine,
4-3-phenoxyphenyl-4-hydroxypiperidine,
4-4-cyclohexylphenyl-4-hydroxypiperidine,
4-4-cycloheptyloxyphenyl-4-hydroxypiperidine,
4-2-iodophenyl-4-hydroxypiperidine,
4-2-methylthiophenyl-4-hydroxypiperidine and
4-4-ethylsulfonylphenyl-4-hydroxypiperidine, the following compounds are produced, N-benzyl-β-[4-(3-fluorophenyl)-4-hydroxypiperidino]propionamide,
N-benzyl-β-[4-(4-trifluoromethylphenyl)4-hydroxypiperidino]propionamide,
N-benzyl-β-[4-(2-bromophenyl)-4-hydroxypiperidino]propionamide,
N-benzyl-β-[4-(3-chlorophenyl)-4-hydroxypiperidino]propionamide,
N-benzyl-β-[4-(2-sulfamylphenyl)-4-hydroxypiperidino]propionamide,
N-benzyl-β-[4-(3-hydroxyphenyl)-4-hydroxypiperidino]propionamide,
N-benzyl-β-[4-(4-ethylphenyl)-4-hydroxypiperidino]propionamide,
N-benzyl-β-[4-(3-methylphenyl)-4-hydroxypiperidino]propionamide,
N-benzyl-β-[4-(2,4-dimethoxyphenyl)-4-hydroxypiperidino]propionamide,
N-benzyl-β-[4-(3-methylthiophenyl)-4-hydroxypiperidino]propionamide,
N-benzyl-β-[4-(2-aminophenyl)-4-hydroxypiperidino]propionamide,
N-benzyl-β-[4-(4-chlorophenyl)-4-hydroxypiperidino]propionamide,
N-benzyl-β-[4-(3-trifluoromethylphenyl)-4-hydroxypiperidino]propionamide,
N-benzyl-β-[4-(3,4-methylenedioxyphenyl)-4-hydroxypiperidino]propionamide,
N-β-naphthylmethyl-β-(4-phenyl-4-hydroxypiperidino)propionamide,
N-α-naphthylmethyl-β-(4-phenyl-4-hydroxypiperidino)propionamide,
N-(3-chlorobenzyl)-β-(4-phenyl-4-hydroxypiperidino)propionamide,
N-(3-hydroxy-4-chlorobenzyl)-β-(4-phenyl-4-hydroxypiperidino)propionamide,
N-(3-methoxybenzyl)-β-(4-phenyl-4-hydroxypiperidino)propionamide,
N-(3-nitrobenzyl)-β-(4-phenyl-4-hydroxypiperidino)propionamide,
N-(3,4-methylenedioxybenzyl)-β-(4-phenyl-4-hydroxypiperidino)propionamide,
N-(2,6-dibromobenzyl)-β-(4-phenyl-4-hydroxypiperidino)propionamide,
N-(3,4-dimethylbenzyl)-β-(4-phenyl-4-hydroxypiperidino)propionamide,
N-(2-bromo-4-hydroxybenzyl)-β-(4-phenyl-4-hydroxypiperidino)propionamide,
N-(2-bromo-3-hydroxybenzyl)-β-(4-phenyl-4-hydroxypiperidino)propionamide,
N-(2,5-dimethoxybenzyl)-β-(4-phenyl-4-hydroxypiperidino)propionamide,
N-phenylethyl-β-(4-phenyl-4-hydroxypiperidino)propionamide,
N-(4-iodobenzyl)-β-(4-phenyl-4-hydroxypiperidino)propionamide,
N-(3-fluorobenzyl)-β-(4-phenyl-4-hydroxypiperidino)propionamide,
N-(4-trifluoromethylbenzyl)-β-(4-phenyl-4-hydroxypiperidino)propionamide,
N-(3-aminobenzyl)-β-(4-phenyl-4-hydroxypiperidino)propionamide,
N-(2-methylaminobenzyl)-β-(4-phenyl-4-hydroxypiperidino)propionamide,
N-(3-dimethylaminobenzyl-β-(4-phenyl-4-hydroxypiperidino)propionamide,
N-(2-methylbenzyl)-β-(4-phenyl-4-hydroxypiperidino)propionamide,
N-(4-phenylbenzyl)-β-(4-phenyl-4-hydroxypiperidino)propionamide,
N-(3-benzylbenzyl)-β-(4-phenyl-4-hydroxypiperidino)propionamide,
N-benzyl-β-[4-(4-methoxyphenyl)-4-hydroxypiperidino]propionamide,
N-benzyl-β-[4-(2-methylaminophenyl)-4-hydroxypiperidino]propionamide,
N-benzyl-β-[4-(3-diethylaminophenyl)-4-hydroxypiperidino]propionamide,
N-benzyl-β-[4-(2-acetylphenyl)-4-hydroxypiperidino]propionamide,
N-benzyl-β-[4-acetamidophenyl)-4-hydroxypiperidino]propionamide,
N-benzyl-β-[4-(2-propylthiophenyl)-4-hydroxypiperidino]propionamide,
N-benzyl-β-[4-(2-hydroxy-4-nitrophenyl)-4-hydroxypiperidino]propionamide,
N-benzyl-β-[4-(4-phenylphenyl)4-hydroxypiperidino]propionamide,
N-benzyl-β-[4-(3-benzylphenyl)-4-hydroxypiperidino]propionamide,
N-benzyl-β-[4-(3-phenoxyphenyl)-4-hydroxypiperidino]propionamide,
N-benzyl-β-[4-(4-cyclohexylphenyl)-4-hydroxypiperidino]propionamide,
N-benzyl-4-[4-(4-cycloheptyloxyphenyl)-4-hydroxypiperidino]propionamide,
N-benzyl-β-[4-(2-iodophenyl)-4-hydroxypiperidino]propionamide, N-benzyl-β-[4-(2-methylthiophenyl)-4-hydroxy-piperidino]propionamide and
N-benzyl-β-[4-(4-ethylsulfonylphenyl)-4-hydroxy-piperidino]propionamide,
respectively.

EXAMPLE 9

In the procedure of Example 4, N-benzyl-β-chloropropionamide is replaced by 0.05 mole of each of the aralkyl-β-chloropropionamides prepared in Example 2, to produce the following products, N-(4-phenoxybenzyl)-β-(4-phenyl-4-hydroxypiperidino)propionamide,
N-(cyclohexylbenzyl)-β-(4-phenyl-4-hydroxypiperidino)propionamide,
N-(4-cyclopentyloxybenzyl)-β-(4-phenyl-4-hydroxy-piperidino)propionamide,
N-(4-sulfamylbenzyl)-β-(4-phenyl-4-hydroxypiperidino)propionamide,
N-(3-acetamidobenzyl)-β-(4-phenyl-4-hydroxy-piperidino)propionamide,
N-(4-methylthiobenzyl)-β-(4-phenyl-4-hydroxy-piperidino)propionamide,
N-(4-acetylbenzyl)-β-(4-phenyl-4-hydroxypiperidino)propionamide,
N-(3-methylsulfonylbenzyl)-β-(4-phenyl-4-hydroxy-piperidino)propionamide,
N-(4-trifluoromethyl-1-naphthylmethyl)-β-(4-phenyl-4-hydroxypiperidino)propionamide,
N-(2,7-dibromo-3-naphthylmethyl)-β-(4-phenyl-4-hydroxypiperidino)propionamide and
N-phenylisopropyl-β-(4-phenyl-4-hydroxypiperidino)propionamide,
respectively.

EXAMPLE 10

When, in the procedure of Example 4, N-2-phenylcyclopropyl-β chloropropionamide is replaced by an equal molar amount of each of the N-benzyl-β-chloro and tosyl alkylamides prepared in Example 3, the following products are produced, N-benzyl-(4-phenyl-4-hydroxypiperidino)acetamide,
N-benzyl-α-(4-phenyl-4-hydroxypiperidino)propionamide,
N-benzyl-γ-(4-phenyl-4-hydroxypiperidino)butyramide,
N-benzyl-β-(4-phenyl-4-hydroxypiperidino)propionamide,
N-benzyl-γ-(4-phenyl-4-hydroxypiperidino)hexanoamide and
N-benzyl-β-(4-phenyl-4-hydroxypiperidino)propionamide.

What is claimed is:

1. A compound selected from the group consisting of compounds of the formula

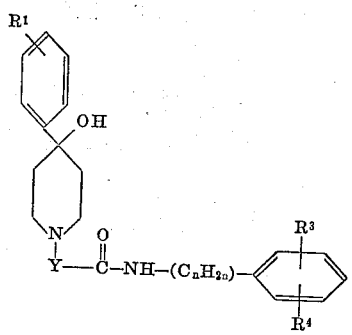

wherein $R^1$ is a member selected from the group consisting of chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, cycloalkoxy radicals having 5 to 7 carbon atoms inclusive, $R^3$ and $R^4$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkaknoylamino, (lower)alkylthio, sulfamyl, (lower)alkanoyl, (lower)alkylsulfonyl, methylenedioxy, cycloalkyl radicals having from 5 to 7 carbon atoms inclusive, cycloalkoxy radicals having from 5 to 7 carbon atoms inclusive, Y is a (lower)alkylene radical, and
n is a whole integer from 1 to 6 inclusive;

and the pharmaceutically acceptable nontoxic salts thereof.

2. A compound selected from the group consisting of compounds of the formula

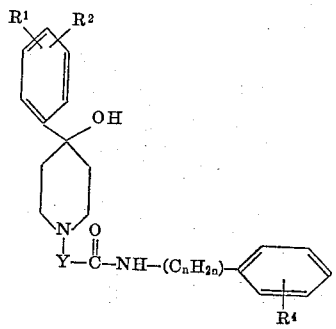

wherein $R^1$ and $R^2$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, cycloalkoxy radicals having from 5 to 7 carbon atoms inclusive, $R^4$ is a member selected from the group consisting of chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, cycloalkoxy radicals having from 5 to 7 carbon atoms inclusive, Y is a (lower)alkylene radical, and
n is a whole integer from 1 to 6 inclusive;

and the pharmaceutically acceptable nontoxic salts thereof.

3. A compound selected from the group consisting of compounds of the formula

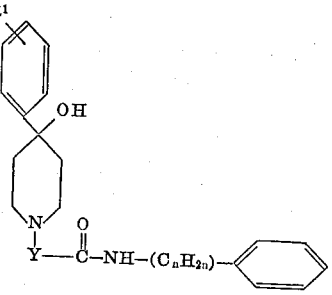

wherein

R¹ is a member selected from the group consisting of chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, cycloalkoxy radicals having from 5 to 7 carbon atoms inclusive, Y is a (lower)alkylene radical, and $n$ is a whole integer from 1 to 6 inclusive;

and the pharmaceutically acceptable nontoxic salts thereof.

4. A compound selected from the group consisting of compounds of the formula

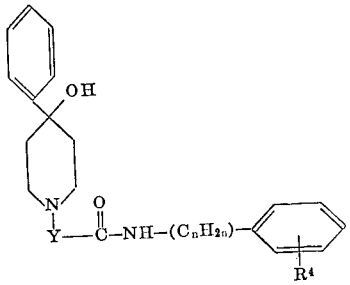

wherein

R⁴ is a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, cycloalkoxy radicals having from 5 to 7 carbon atoms inclusive, Y is a (lower)alkylene radical, and $n$ is a whole integer from 1 to 6 inclusive;

and the pharmaceutically acceptable nontoxic salts thereof.

5. A compound selected from the group consisting of compounds of the formula

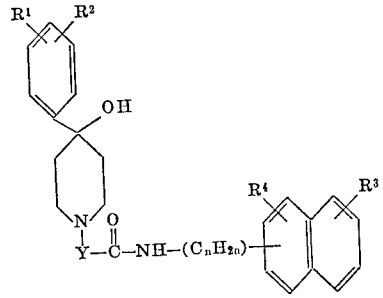

wherein

R¹, R², R³ and R⁴ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, cycloalkoxy radicals having from 5 to 7 carbon atoms inclusive, Y is a (lower)alkylene radical, and $n$ is a whole integer from 1 to 6 inclusive;

and the pharmaceutically acceptable nontoxic salts thereof.

6. A compound of the formula

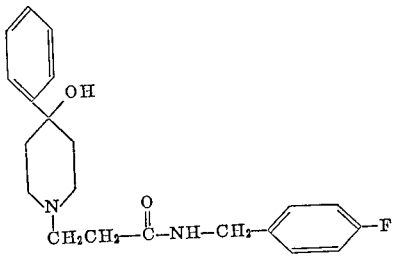

and the pharmaceutically acceptable nontoxic salts thereof.

7. A compound of the formula

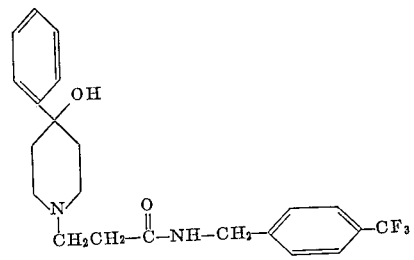

and the pharmaceutically acceptable nontoxic salts thereof.

8. A compound of the formula

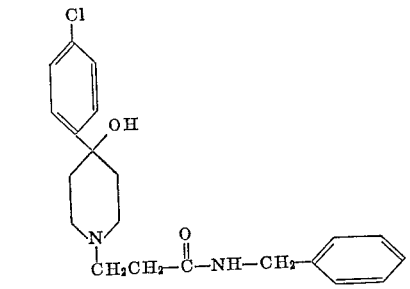

and the pharmaceutically acceptable nontoxic salts thereof.

References Cited

UNITED STATES PATENTS 3,117,139  1/1964  Mooradian -------- 260—294.3

OTHER REFERENCES

Burger, Medicinal Chemistry 2nd, Interscience Pub. (1960), N.Y., pp. 637 and 638.

JOHN D. RANDOLPH, *Primary Examiner.*

WALTER A. MODANCE, *Examiner.*

A. SPEVACK, *Assistant Examiner.*